May 28, 1957  I. V. BRUMBAUGH  2,793,421
METHOD OF FORMING A MANIFOLD
Filed Dec. 17, 1952  3 Sheets-Sheet 2
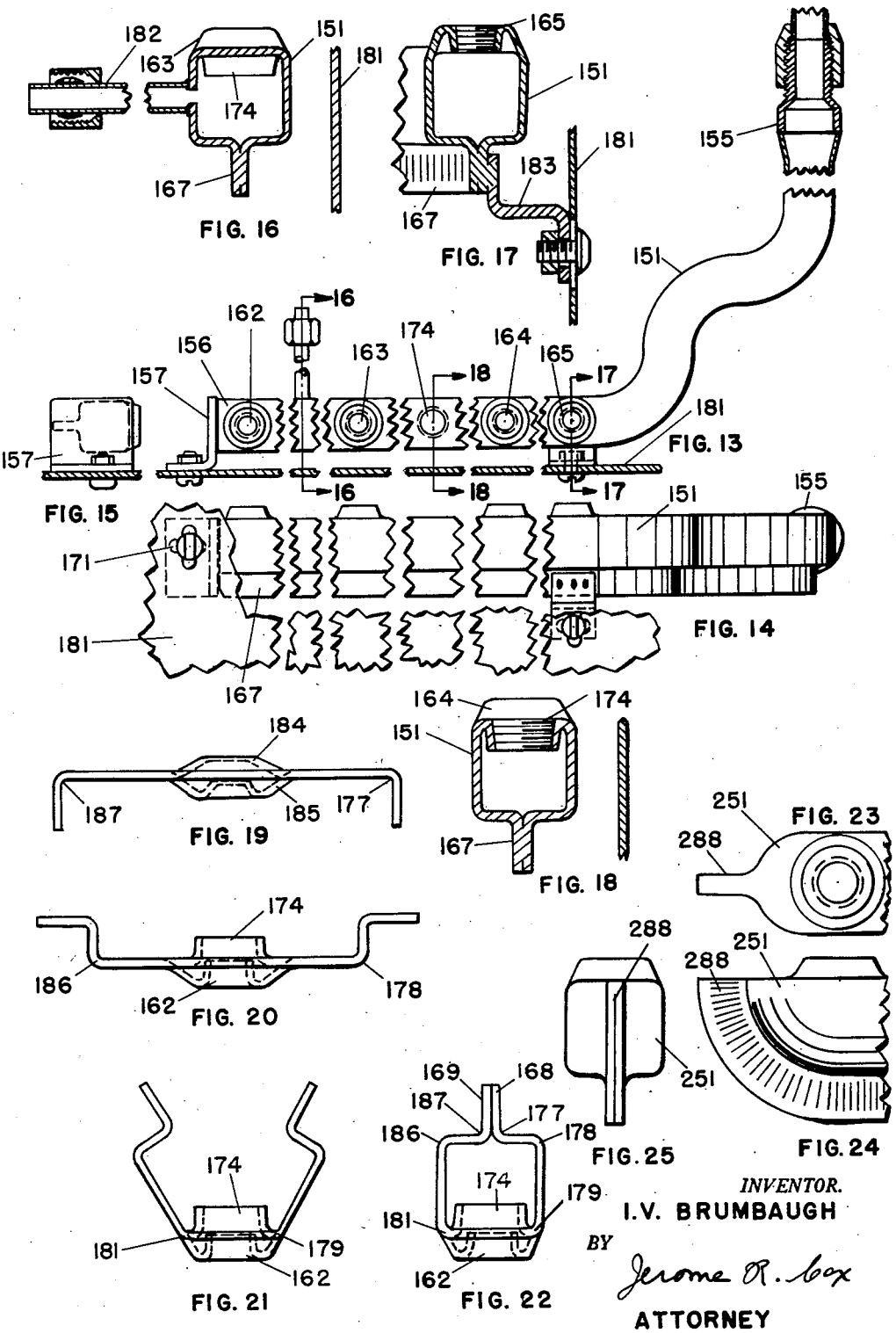
INVENTOR.
I.V. BRUMBAUGH
BY
Jerome R. Cox
ATTORNEY May 28, 1957     I. V. BRUMBAUGH     2,793,421
METHOD OF FORMING A MANIFOLD
Filed Dec. 17, 1952     3 Sheets-Sheet 3
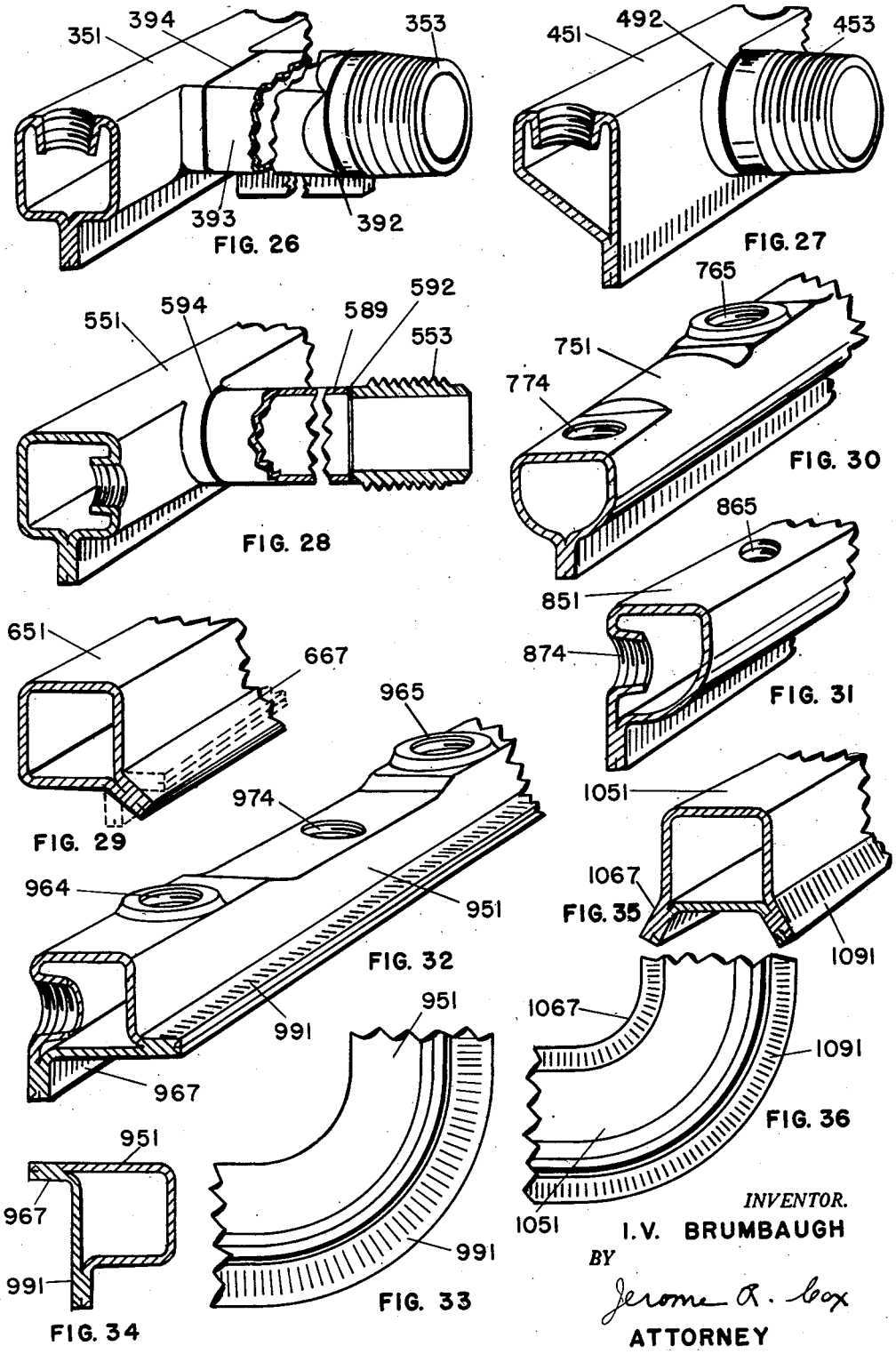

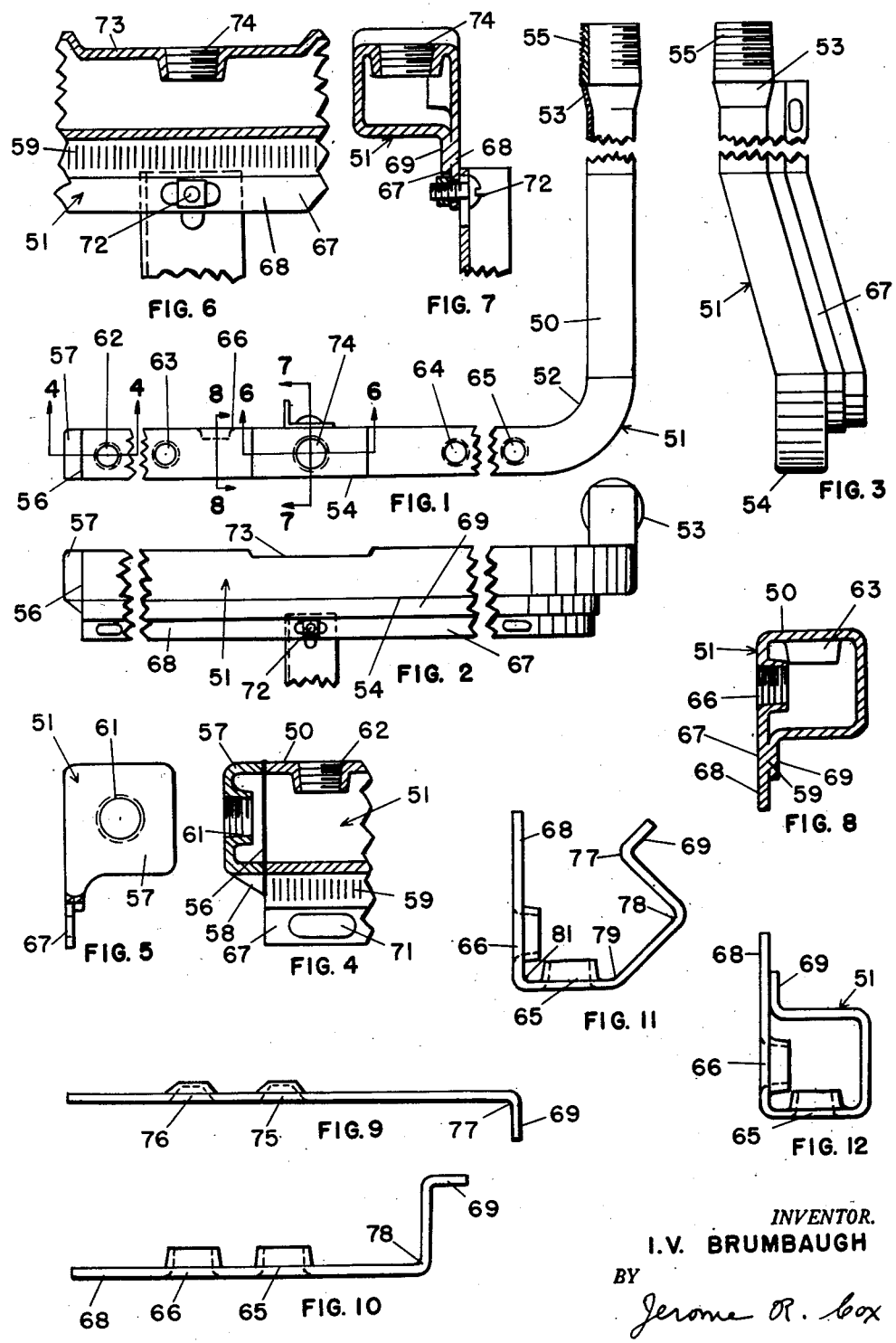

United States Patent Office 2,793,421
Patented May 28, 1957

2,793,421
METHOD OF FORMING A MANIFOLD

Isaac Vernon Brumbaugh, Clayton, Mo.

Application December 17, 1952, Serial No. 326,553

6 Claims. (Cl. 29—157)

The invention disclosed in this application relates to methods of forming fluid conduits and to fluid conduits or manifolds formed by said methods.

Manifolds or conduits of this type have usually been made from metal pipe. Threaded openings in the side walls of such manifolds are provided so that a plurality of outlet connections may be secured thereto in order to distribute the fluid from such manifolds. Threads are desirable so that the connections may be securely fastened.

In the case of gas manifolds, the American Gas Association requirements specify "A continuous run of not less than 3½ American Standard taper pipe threads." This requirement, of course, applies to the wall tappings for gas valves, fittings, etc., but does not apply to the threaded end of the pipe. There have heretofore been two ways to provide the 3½ threads; (1) the use of extra heavy pipe, or (2) expansion of the wall as shown by Patent 1,906,953, in which standard pipe is used. Both of these methods have disadvantages. Heavy pipe is costly. Expansion of the wall leads to lack of accuracy and uniformity, leaking, splitting, etc., etc.

I have conceived the idea of making a manifold from sheet metal so as to obviate the difficulties and to lower the cost of manifolds made from pipe. When a manifold is made from sheet metal it is straight and true as a die. The size of the thread (a standard tapered thread) can be controlled. All of the valves and other outlet connections become gas tight when screwed into their respective positions to the same extent and the centers can be equally controlled for accuracy. Much less metal is required for manifolds made from sheet metal because a much thinner wall is sufficient. The metal of the sheet metal can be formed inward or outward to form flanged openings or openings with collars. These may be formed in the several dies before the closure operation. After forming, the manifold can be further formed or bent in the same manner as is done with pipe. Thus a sheet metal manifold is less costly than a pipe manifold when all the operation and material costs are considered. The total time required to make all the various welds of a sheet metal manifold is about one minute for the average or standard gas manifolds such as are used on domestic gas ranges. Welding operations are relatively cheap and this applies to the longitudinal welds which may be either continuous or intermittent welds.

One of the objects of my invention therefore is the provision of a new type of manifold.

A further object of my invention is the provision of methods for forming a new type of manifold.

A further object of my invention is the provision of methods by which manifolds may be manufactured more cheaply than heretofore.

A further object of my invention is the provision of a manifold which will have a more uniform bearing surface for the insertion of fittings, valves, etc.

A further object of my invention is a provision of methods for forming manifolds which are much cheaper to manufacture than manifolds heretofore manufactured.

Further objects and features of my invention will be apparent from the subjoined specification and claims when considered in connection with the accompanying drawings showing illustrative embodiments of my invention.

In the drawings:

Fig. 1 is a view mainly in plan, and partly in section, having portions broken away, and showing an illustrative form of manifold made in accordance with one of the methods of my invention;

Fig. 2 is a view in side elevation of the manifold of Fig. 1;

Fig. 3 is a side view in elevation of the manifold shown in Fig. 1;

Fig. 4 is a fragmentary view in vertical section taken substantially on the line 4—4 of Fig. 1;

Fig. 5 is a view in end elevation of the manifold of Fig. 1;

Fig. 6 is a fragmentary view in vertical section taken substantially on the line 6—6 of Fig. 1;

Fig. 7 is a view in vertical section taken substantially on the line 7—7 of Fig. 1;

Fig. 8 is a view in vertical section taken substantially on the line 8—8 of Fig. 1;

Fig. 9 is a view in end elevation of a sheet of metal of the type commonly called sheet metal having a pair of elevated portions formed therein and having a bend made adjacent to one end thereof;

Fig. 10 is a view in end elevation of a sheet metal having the elevations completely formed as flanged openings and having two bends of the manifold completed;

Fig. 11 is a view in end elevation of the sheet shown in Figs. 9 and 10 having three of the bends of the manifold completed and having an additional bend of the manifold partially completed;

Fig. 12 is a view in end elevation of the manifold shown in Figs. 9, 10 and 11, having the bends all completed and being ready for the welding operation by which the two ends of the sheet which forms the manifold are secured together and made integral;

Fig. 13 is a fragmentary view in plan of another manifold made according to my invention;

Fig. 14 is a fragmentary view in side elevation showing the manifold of Fig. 13;

Fig. 15 is a view in end elevation showing the manifold of Fig. 13;

Fig. 16 is a view in vertical section taken substantially on the line 16—16 of Fig. 13;

Fig. 17 is a view in vertical section taken substantially on the line 17—17 of Fig. 13;

Fig. 18 is a view in vertical section taken substantially on the line 18—18 of Fig. 13;

Fig. 19 is a view in end elevation of a sheet of sheet metal having an elevated portion formed therein and having a depression formed therein and having the ends bent as a first step in the forming of a manifold such as that which is illustrated in Figs. 13–18, inclusive;

Fig. 20 is a view in end elevation of the sheet shown in Fig. 19, said sheet having had further operations performed thereon in that flanged collars have been formed and the ends have been bent twice in the series of operations of bending the sheet metal on itself around the flanged collars;

Fig. 21 is a view in end elevation of the sheet shown in Figs. 19 and 20 in which further bending operations have been performed;

Fig. 22 is a view in end elevation similar to Figs. 19, 20 and 21 showing the manifold formed from the sheet metal after it has been completely bent into position for welding;

Fig. 23 is a fragmentary view in top plan of the end of a manifold somewhat similar to the manifold of Fig. 13 but having one end closed in a different manner;

Fig. 24 is a view in side elevation of the end of the manifold shown in Fig. 23;

Fig. 25 is a view in end elevation of the manifold shown in Figs. 23 and 24;

Fig. 26 is a fragmentary view partially in perspective and partially in section having portions broken away and showing a manifold constructed according to my invention and having a pipe secured thereto;

Fig. 27 is a fragmentary view partially in perspective and partially in section showing another manifold constructed according to my invention and having a pipe secured thereto;

Fig. 28 is a fragmentary view partially in section of another manifold constructed according to my invention and having a pipe secured thereto;

Fig. 29 is a fragmentary view partially in seection and partially in perspective and showing another manifold constructed according to my invention;

Figs. 30, 31 and 32 are also fragmentary views partially in perspective and partially in section showing other manifolds constructed according to my invention;

Fig. 33 is a fragmentary plan view of another portion of the manifold of Fig. 32;

Fig. 34 is a view in vertical section of the manifold shown in Figs. 32 and 33;

Fig. 35 is a fragmentary view partially in perspective and partially in section showing another two-piece manifold having two longitudinal flanges; and Fig. 36 is a plan view of another portion of the manifold or conduit of Fig. 35, this portion having a right angle formed therein.

*Detailed description*

Referring still to the drawings for a detailed description of the embodiments of my inventions disclosed, I will refer first to the embodiment shown in Figs. 1-8, inclusive. These figures show a typical form of manifold 51 but instead of being a pipe manifold as now is usual, I have formed the manifold of sheet metal. The manifold 51 consists mainly of a sheet metal tube 50 which has a right angled bend as at 52. The gas entrance end 53 is elevated appreciably above the front portion 54 as appears best in Figs. 2 and 3. Also secured on the entrance end 53, there is a short piece of standard threaded pipe 55. This piece of pipe 55 is butt welded to the flared end of the sheet metal tube 50. As appears most clearly in Fig. 1, the pipe 55 has a wall thickness much greater than the thickness of the sheet metal of the tube 53. Figs. 4 and 5 show how the end 56 of the tube 50 is closed in the particular embodiment illustrated. As shown, there is a cup-like member 57 that is secured or attached to the end 56 of the sheet metal tube 50. This member 57 may be attached to the end 56 by butt welding. The cup 57 is formed as at 58 so as to overlap the longitudinal weld 59 of the tube 50. The cup as shown is also formed with a threaded outlet 61. Such outlet is convenient for pilots, lighters, etc., but may, of course, be omitted if desired. Cooking top burner valve connections 62, 63, 64 and 65 are shown in Fig. 1; and connection 62 is shown also in Fig. 4; and another threaded connection 66 is provided on one side of the tube 50 as shown in Figs. 1 and 8, and is used when desired for connecting the manifold to pilots, lighters, etc.

As shown most clearly in Figs. 2, 3, 4, 5, 6, 7 and 8, the sheet metal tube 50 is provided with a flange 67 formed by the overlapping surfaces 68 and 69 of the sheet metal. The surfaces 68 and 69 are secured to each other by the weld 59. The flange 67 is formed as shown in Fig. 4 and elsewhere with an oblong hole 71 whereby the manifold may be adjustably supported as shown at 72 in Figs. 2, 6 and 7.

The upper wall of the manifold 51 is depressed as at 73 (Fig. 6) and in this depressed portion, I provide a flanged threaded outlet 74. The outlet 74 is provided so that an oven heat control unit may be secured to the manifold. Because the threaded connection 74 is at a lower level than the threaded connections 62, 63, 64 and 65 and because the oven heat control unit is longer than the cooking top burner gas cocks, the opposite ends of units can all be arranged in the same line. Thus the front end of all of the controls will be at the same level and in line. The depression 73 can be formed before the sheet metal is bent or after the manifold has been formed and welded or during the forming process.

The method or process of forming the manifold of Figs. 1-8, and the series of operations or stages of said method are illustrated in Figs. 9-12. In the initial stage as shown in Fig. 9, raised portions such as 75 and 76 may be formed. These raised portions 75 and 76 are later to be openings in the metal, are to be provided with flanged collars, and will be threaded to form connections for the oven heat control unit, the cooking top burner valves, pilot valves, etc. The depressions 75 and 76 thus may become the flanged collars 65 and 66 respectively.

Also in the initial stage, if desired, one or more bends may be formed such as, for example, the bend 77 which provides the surface 69. Later the bends 78, 79 and 81 may be formed until the closed tube is formed as shown in Fig. 12. Then the overlapping surfaces 68 and 69 are welded by a weld such as the weld 59. This weld may be a continuous or intermittent weld.

Another manifold 151 in which there is a different procedure in the folding (or bending) of the sheet is shown in Figs. 13-18, inclusive. In this case the flange 167 for the longitudinal weld is positioned along the "center line" of the conduit. This conduit can be bent both "left" and "right" as shown by Figs. 13 and 14. Also, a flared connection member 155 containing male threads is butt welded to the entrance end of the conduit. More and more gas ranges are being connected to semi-rigid tubing. My construction thus reduces the cost of gas connections by providing the male threaded member for semi-rigid tubing instead of the pipe connection as shown by Figs. 1 and 2.

The other end 156 of this manifold 151 is closed by a bracket 157 butt welded to it. The bracket and the supporting panel 181 both have an oblong hole such as 171 so that the manifold can be adjusted to its proper position.

Fig. 16 shows how a small tube 182 for supplying gas to a pilot or lighter, etc., can be butt welded to the side of the conduit and thus eliminate a fitting. This is a saving. Such fittings are usually made from brass and they are expensive.

Fig. 17 shows a threaded connection 165 for a cooking top burner valve and also a section through a supporting bracket 183 that is welded to the flange. The threaded collar is formed in a "raised" portion of the conduit which also means that it is elevated by an expanded operation of the sheeet metal. This structure is achieved by the operations of expanding the metal to form a pedestal containing a collar and then folding the metal around the inwardly extending collar to produce a conduit.

Fig. 18 shows a threaded flanged opening 174 for a connection for an oven heat control.

It will be noted that the opening 174 is larger than the opening 165. It thus is suitable for connecting to an oven heat control or other unit which requires the passage of more gas than the burner valves which may be connected to openings 162, 163, 164 and 165. The metal is "folded around" the collar or flange very closely, as is shown also in Fig. 7. This can be done without distorting the collar in either case.

It should be evident that the threaded collar of Fig. 18 could be depressed the same as shown by Fig. 7. By "depressing" the collar for the oven heat control and "raising" the collars for the cooking top burner valves, I am permitted to use valves having short shanks. This means less brass, and less expense to the manufacturer.

Referring to Figs. 19–22 wherein a series of operations in the forming of a manifold such as 151 is illustrated, it may be seen that I may initially raise a portion 184 of the metal preliminary to forming flanged collars such as the collar 174 and depress other portions such as portion 185 preliminary to forming flanged collars such as 162, 163, 164 and 165. The sheet is then bent as at 177, 178, 179, 181, 186 and 187 in stages until the manifold 151 is shaped as shown in Fig. 22. Then the surfaces 168 and 169 are welded.

Figs. 23, 24 and 25 show another way for closing the end of a similar manifold 251. It is done by mashing the end together in a die preferably before the longitudinal weld is made and then extending the longitudinal weld around the end as shown at 288. I have thus shown three ways for closing the end of these sheet metal conduits or manifolds. The wall thickness of my sheet metal manifolds may vary depending on the requirements. It depends somewhat on the coarseness (depth) of the thread.

In Figs. 26, 27 and 28, I have shown three different perspective illustrations of T-manifold constructions designated respectively 351, 451 and 551. Manifolds 351 and 451 are for standard pipe connections 353 and 453 respectively whereas there is provided a semi-rigid tubing connection 553 for manifold 551 which is similar to that shown in Fig. 13. The pipe connection 353 is welded as at 392 to a section 393 which is in turn welded as at 394 to the manifold 351. The pipe connection 453 is welded as at 492 to the manifold 451. However, the semi-rigid tubing connection 553 is butt welded to semi-rigid (thin wall) tubing 589 as at 592, the tubing 589 being in turn butt welded to the manifold as at 594.

Fig. 29 shows a conduit 651 that has the welded flange 667 formed at an angle from one of the "corners." By first bending the flange 667 (see dotted lines) down or up the conduit may be more readily bent or formed to produce a manifold which curves in several different directions.

Fig. 30 shows a manifold 751 of which the wall is round. A portion of the round wall is formed with a raised flat portion which may constitute a pedestal for the flanged collar 765 and with a depressed surface for the flanged collar 774. The manifold 851 of Fig. 31 has one rounded wall and a plurality of flat walls, the flanged collars 865 and 874 being formed in the flat walls.

In Figs. 32, 33 and 34 I have shown a manifold 951 having two longitudinal flanges 967 and 991. There are also shown two raised valve connections or flanged collars 964 and 965 and a depressed valve connection or flanged collar 974. The right angle bend of manifold 951 in Fig. 33 was produced from two pieces of sheet metal, each of which was an L-shaped sheet originally.

Figs. 35 and 36 show another variation of a 2-piece conduit 1051 having two longitudinal flanges 1067 and 1091. The right angle bend of Fig. 36 would be formed also from two pieces of L-shaped sheet metal.

It should be pointed out in connection with all of the embodiments described that after the longitudinal flange is continuously or intermittently welded the manifold is completely sealed longitudinally. Furthermore, subsequent bending of the flange in any direction does not cause the weld to fail or leak. Then too, the longitudinal flange actually reinforces the manifold or conduit. I want to point out furthermore in the embodiments that are shown the flanged collars all extend inwardly and are provided with tapered threads. Thus there is eliminated any tendency for the collars to crack or split as they might if the collars extended outwardly, especially when the thread is to be tapered. It should be understood, however, that the invention is not limited to collars which extend inwardly. However, if the collars are formed outward I would recommend the use of metal of greater thickness to provide greater strength, especially if the threads are to be tapered.

Thus it is clear that my fluid conduits with one or more flanged openings are formed by a series of operations which may include one or more of the following: (1) forming one or more flanged collars on either side of sheet metal; (2) bending the sheet on itself without distorting the collar to form a conduit having a longitudinal passageway through it so that the collar is either inside or outside of the conduit; (3) welding longitudinal surfaces of the sheet; (4) threading the inside of the flange of the collar; (5) attaching a threaded member to one end of the conduit by welding; (6) welding a closure member to the other end or closing the end by mashing and welding. These do not necessarily have to be separate steps as several of the operations listed above may be completed at the same time.

It should be evident to anyone familiar with the forming of sheet metal that while most of my illustrations or embodiments show a rectangular shaped conduit, there are a variety of other shapes that are equally as satisfactory, as indicated by Figs. 27, 30 and 31. The space into which the manifold is to be installed and other manufacturing problems may be contributing factors as to whether the conduit of the manifold should be predominately square or rectangular or round or semi-round, etc.

By my methods I obtain conduits having a longitudinal passageway and having flanged openings in the walls formed from sheet metal and closed by a longitudinal weld. My conduits are especially useful as manifolds for various types of gas appliances. Such manifolds may have openings with flanged collars formed with tapered or straight threads. Such manifolds may often have standard pipe or flexible pipe welded thereto either at one end or as a T connection at an intermediate point. Closure members can include a bracket, or a cup-shaped closure member may be provided.

It is to be understood that the above described embodiments of my inventions are for the purpose of illustration only and various changes may be made therein without departing from the spirit of the inventions as defined by the appended claims.

I claim:

1. A method of forming a gas appliance manifold having a flanged opening in a wall thereof comprising a series of operations which comprise initially the forming of an apertured internally tapered collar on one side of a piece of sheet metal so that the largest internal diameter of the tapered collar is substantially in the plane of the piece of sheet metal; then bending said sheet metal on itself around said collar so that said collar is on the inside of the manifold; thereafter placing the opposite edges of said sheet in contact with each other so that the edges of said sheet form adjacent contacting parallel surfaces; then and thereafter welding said adjacent surfaces of said manifold to each other.

2. A method of forming a gas appliance manifold having a threaded opening in a wall thereof comprising the steps of claim 1 in which there is the additional step of thereafter threading the inside of said collar to form an internally inwardly tapered internally threaded flanged opening in said manifold.

3. A method of forming a gas appliance manifold having a flanged opening in a wall thereof comprising the series of operations of claim 1 in which there are the additional steps of mashing one end so that the walls at the end contact each other to form adjacent surfaces; and thereafter welding said adjacent surfaces of said manifold to each other.

4. A method of forming a gas appliance manifold comprising the steps of claim 1 in which there is the additional subsequent step of welding a cup like closure member to an open end of said welded sheet metal manifold.

5. A method of forming a gas appliance manifold comprising the steps of claim 1 in which there is the additional step of thereafter welding a tubular pipe member of greater thickness than the sheet metal to an open end of the welded sheet metal manifold so formed.

6. A method of forming a gas appliance manifold comprising the steps of claim 1 in which before the sheet metal is bent on itself there is a second tapered collar formed in line with the first named tapered collar but at a different elevation relative to the surface of the sheet metal from the elevation of the first named tapered collar.

References Cited in the file of this patent

UNITED STATES PATENTS

| | | |
|---|---|---|
| 549,992 | Bush | Nov. 19, 1895 |
| 1,246,456 | Parpert | Nov. 13, 1917 |
| 1,264,854 | Possons | Apr. 30, 1918 |
| 1,271,779 | Schroeder et al. | July 9, 1918 |
| 1,830,262 | Carlson | Nov. 3, 1931 |
| 1,952,955 | Trageser | Mar. 27, 1934 |
| 2,053,336 | Jacobson | Sept. 8, 1936 |
| 2,633,190 | Kerwin | Mar. 31, 1953 |

FOREIGN PATENTS

| | | |
|---|---|---|
| 6,148 | Great Britain | A. D. 1891 |